(12) United States Patent
Sharad et al.

(10) Patent No.: US 10,691,681 B2
(45) Date of Patent: Jun. 23, 2020

(54) QUERY LANGUAGE DISTRIBUTION HEURISTICS

(71) Applicant: MICROSOFT TECHNOLOGY LICENSING, LLC, Redmond, WA (US)

(72) Inventors: Aditya Sharad, Oxford (GB); Alexander Eyers-Taylor, Oxford (GB); Michael Peyton Jones, Oxford (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 273 days.

(21) Appl. No.: 15/711,378

(22) Filed: Sep. 21, 2017

(65) Prior Publication Data

US 2019/0087456 A1 Mar. 21, 2019

(51) Int. Cl.
*G06F 16/242* (2019.01)
*G06F 16/2453* (2019.01)

(52) U.S. Cl.
CPC ........ *G06F 16/2433* (2019.01); *G06F 16/242* (2019.01); *G06F 16/2454* (2019.01); *G06F 16/24537* (2019.01)

(58) Field of Classification Search
CPC ............... G06F 16/242; G06F 16/2433; G06F 16/24537; G06F 16/2454
See application file for complete search history.

(56) References Cited

U.S. PATENT DOCUMENTS

| | | | |
|---|---|---|---|
| 6,567,802 B1 | 5/2003 | Popa et al. | |
| 8,661,023 B1 | 2/2014 | Chun et al. | |
| 9,092,484 B1* | 7/2015 | Abraham | G06F 16/24542 |
| 9,223,827 B2 | 12/2015 | Hou et al. | |
| 9,639,575 B2 | 5/2017 | Leida et al. | |
| 2005/0003878 A1 | 1/2005 | Updike | |
| 2008/0021797 A1* | 1/2008 | Moeller | G06Q 10/087 705/29 |
| 2011/0093500 A1 | 4/2011 | Meyer et al. | |

* cited by examiner

*Primary Examiner* — Jay A Morrison
*Assistant Examiner* — Xiaoqin Hu
(74) *Attorney, Agent, or Firm* — Workman Nydegger (57) ABSTRACT

Methods, systems, and apparatus, including computer programs encoded on computer storage media, for performing local distribution heuristics. One of the methods includes receiving an original expression having a conjunction comprising a context term and a disjunction of a plurality of other terms. The context term and the disjunction are evaluated according to one or more local distribution heuristics to determine that the context term is a candidate for distribution across the disjunction of the plurality of other terms. In response, a transformed expression is generated in which the candidate context term is distributed across the disjunction of the plurality of other terms.

20 Claims, 4 Drawing Sheets

QUERY LANGUAGE DISTRIBUTION HEURISTICS

BACKGROUND

This specification relates to data processing, and in particular, to processing query language statements.

Query languages operate on relations. A relation is a set of tuples $(t_1, \ldots, t_n)$, each tuple having $n \geq 1$ data elements $t_i$. Each element $t_i$ represents a corresponding value, which may represent a value of a corresponding attribute having an attribute name. Relations are commonly thought of as, represented as, and referred to as tables in which each row is a tuple and each column is an attribute. However, a relation need not be implemented in tabular form, and the tuples belonging to a relation can be stored in any appropriate form.

As used in this description, a query language program includes one or more expressions, and an expression includes one or more terms. Each term is a construct of the query language that can be evaluated to a relation on free variables of the term. Terms of query languages can include predicate calls, existential quantifiers, and universal quantifiers, to name just a few examples. A predicate call operates on a relation and returns attributes of any free variables for any tuples in the relation matching any bound variables.

A disjunction defines a logical "or" between terms. For example, a disjunction between a term "a" and a term "b" can be expressed as "a or b." Each term of a disjunction can for brevity be referred to as a disjunct.

A conjunction defines a logical "and" between terms. For example, a disjunction between a term "a" and a term "b" can be expressed as "a and b." Each term of a conjunction can for brevity be referred to as a conjunct.

In this specification, "or" and "and", when used in a query language expression, denote operators in a pseudocode query language. Real-world query language implementations have corresponding operators that may be expressed with the same or different syntax and which provide semantically equivalent functions. For example, conjunction in a query language can be denoted by "AND", "&", or "&&," to name just a few examples. Similarly, disjunction in a query language can be denoted by "OR", "|", or "||", to name just a few examples.

Evaluation engines of query languages can perform distributive transformations of query language expressions.

For example, the following pseudocode query language expression:
 exp1 (a) and (exp2 (b) or exp3 (c))
can be rewritten as the following revised version:
 (exp1 (a) and exp2 (b)) or (exp1 (a) and exp3 (c))
In the revised version, the term "a" has been distributed over the disjunction of the terms "b" and "c". The effect of this rewrite changes how an evaluation engine for the query language will evaluate the expression. Instead of evaluating the disjunction (exp2 (b) or exp3 (c)) first as would have been the case in the original version, when evaluating the revised version, the evaluation engine will evaluate (exp1 (a) and exp2 (b)) and will also evaluate (exp1 (a) and exp3 (c)) before evaluating a disjunction of the results.

Some query evaluation engines automatically transform expressions into "disjunctive normal form" by repeatedly distributing all context terms over all disjunctions until no further distributions are possible. Therefore, in disjunctive normal form, an expression is completely transformed into a disjunction of conjunctions. In other words, an expression in disjunctive normal form has the form "c_1 or c_2 ... or c_n", where every c_i is a conjunction of terms which itself includes no disjunctions.

Using disjunctive normal form can introduce unwanted complexity into a query language program. One problem is that transforming expressions using disjunctive normal form can result in expressions that are very large and which are therefore cumbersome and time-consuming to evaluate. Another problem is that using disjunctive normal form can cause repetition of terms that are expensive to evaluate individually.

SUMMARY

This specification describes techniques for an evaluation engine of a query language to select which context terms to locally distribute in a query language program.

In this specification, a "context term" is a query language term that occurs in a conjunction along with a another term having a disjunction of multiple other terms over which the context term can be distributed. For example, in the expression:
 a and (b or c)
The term "a" is a context term because it occurs in a conjunction with a disjunction of the term "b" and the term "c" over which the context term can be distributed.

As another example, a context term can occur in a conjunction with an existential or a universal quantifier having a disjunction of other terms:
 a and exists (x: (b or c))
In this example, "a" is also a context term because it occurs in a conjunction with an existential quantifier having a disjunction over which the context term can be distributed.

The techniques described in this specification can be used to determine when a context term in a query language expression should be distributed over the multiple terms in the corresponding disjunction. In particular, this specification describes local distribution heuristics that determine whether or not a context term should be designated as a candidate for distribution into a single corresponding disjunction. The distribution heuristics are described as being local distribution heuristics because they can be used to individually evaluate a context term and disjunction pair without considering any other terms of an expression. Thus, the distribution heuristics can be used to separately evaluate each context term paired with each of any arbitrary number of disjunctions in an expression.

For example, applying local distribution heuristics to the following expression:
 a and (b or c) and (d or e)
involves considering the context term paired with the first disjunction (b or c) as well as separately considering the context term paired with the second disjunction (d or e). If the example expression had more disjunctions, applying the local distributions heuristics can also include separately considering the context term paired with each of the other disjunctions as well.

Therefore, in this example, the following outcomes are possible:
 a and (b or c) and (d or e) (no distribution)
 (a and b or a and c) and (d or e) (distribution into the first disjunction only)
 (b or c) and (a and d or a and e) (distribution into the second disjunction only)
 (a and b or a and c) and (a and d or a and e) (distribution into both)

This specification also describes deletion heuristics, which determine when a context term can be removed from the context of the expression after being distributed. This is generally a separate consideration from whether or not the context term should be distributed. Therefore, all of the following expressions are possible outcomes of applying the local distribution heuristics and the deletion heuristics:

a and (b or c) (no distribution and no deletion),
((a and b) or (a and c)) (distribution and deletion),
a and ((a and b) or (a and c)) (distribution but no deletion).

Particular embodiments of the subject matter described in this specification can be implemented so as to realize one or more of the following advantages. Performing advanced distribution heuristics improves the performance of executing query language programs both in terms of execution time and storage space required to execute the program. Performing local distribution heuristics allows only some context terms of an expression to be distributed rather than all context terms as required by disjunctive normal form. Performing local distributions also provides an evaluation engine with more options for join ordering without the distribution making the expression undesirable in other ways. The techniques described in this specification can reduce the number of Cartesian product and Cartesian-product-like terms that need to be computed. Recursive terms can be safely distributed without changing the linearity of the program.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
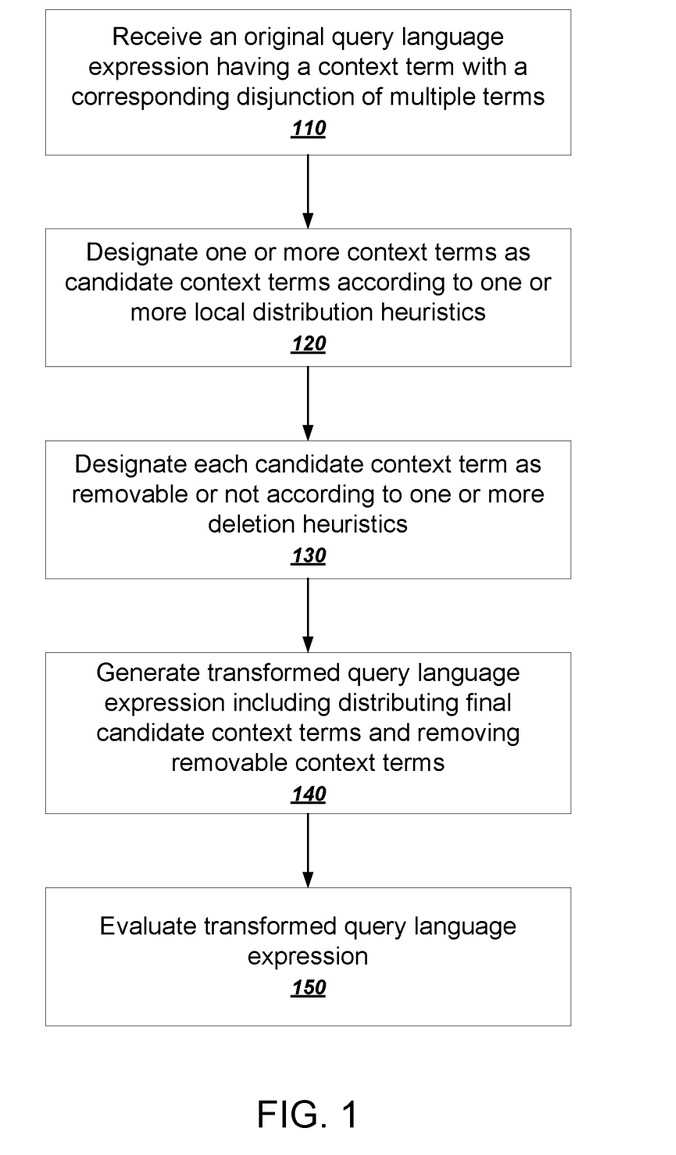
FIG. 1 is a flow chart of an example process for transforming a query language expression using local distribution and deletion heuristics.

FIG. 1 is a flow chart of an example process for transforming a query language expression using local distribution and deletion heuristics. The example process can be performed by an evaluation engine or a query optimizer of an appropriate query language. For convenience, the process will be described as being performed by a system of one or more computers, located in one or more locations, and programmed appropriately in accordance with this specification.

The system receives an original query language expression having one or more context terms and respective corresponding disjunctions of multiple terms (110). The query language expression can be written in any appropriate query language that operates on associated tables or relations. For example, the query language expression can be written in Standard Query Language (SQL), Datalog, or Object Query Language (OQL), to name just a few examples.

The query language expression can be part of a computer program written by a user. The query language expression can also be automatically generated. For example, compilers that translate from one query language to another can generate query language expressions having a context term and a disjunction of multiple terms.

The system designates one or more context terms as candidate context terms according to one or more local distribution heuristics (120). A distribution heuristic is a local distribution heuristic if it can be applied individually to a particular context term and disjunction pair rather than to all context terms in all disjunctions of an expression. Therefore, for each context term in the expression, the system can separately evaluate the context term and each corresponding disjunction according to the local distribution heuristics.

In this specification, a candidate context term is a context term that one or more local distribution heuristics has designated as being a candidate for distribution into one or more disjunctions. Example local distribution heuristics are described in more detail below with reference to FIG. 2 and FIG. 3. The system can use one or both of these distribution heuristics in order to designate each context term in the expression as a candidate context term or not.

The system designates one or more candidate context terms as deletion candidates according to one or more deletion heuristics (130). A deletion heuristic determines when a candidate context term can be safely deleted from the context outside of the disjunction after being distributed. If a candidate context term cannot be safely deleted from the outside of the disjunction, its status as a candidate context term can be revoked entirely. This can then require the system to reevaluate the deletion heuristics. This process can be performed iteratively as a fixed point computation. This process is described more detail below with reference to FIG. 4.

The system generates a transformed query language expression including distributing any final candidate context terms and removing any context terms that are deletion candidates (140). The above-mentioned steps result in the generation of two lists: (1) a first set of pairs of candidate context terms and corresponding disjunctions, each pair representing a context term and disjunction over when the context term is safe to distribute, and (2) a second set of candidate context terms that are safe to delete from the context. The system can thus generate the transformed query language expression by (1) distributing each final candidate context term in the first set over each disjunction paired with the candidate context terms in the first set, and (2) removing from the context of the expression all context terms in the second set.

The system evaluates the transformed query language expression (150). The distribution of context terms in the transformed query language expression will generally result in an evaluation engine for the query language evaluating the terms in a different order than the terms would have been evaluated in the original query language expression. For context terms that were distributed, the transformed query language expression will specify evaluating conjunctions of the context terms first and then only afterwards evaluating disjunctions of the results.

Figure 2:
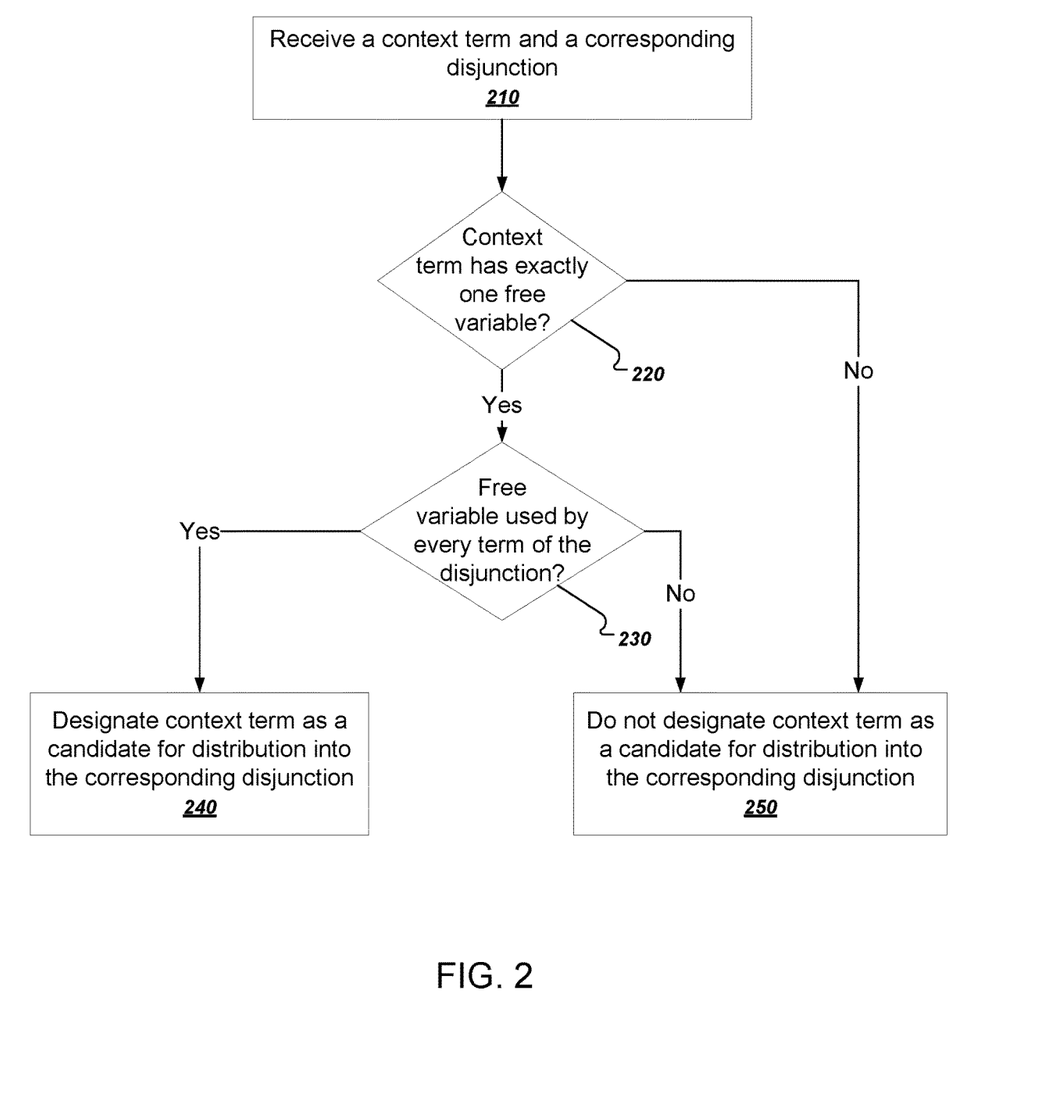
FIG. 2 is a flow chart of an example process for evaluating a context term and a corresponding disjunction according to a free variable distribution heuristic.

FIG. 2 is a flow chart of an example process for evaluating a context term and a corresponding disjunction according to a free variable distribution heuristic. The example process is an example of a local distribution heuristic that can be used to designate a context term as being a candidate for distribution. The example process can be performed by an evaluation engine or a query optimizer of an appropriate query language. For convenience, the process will be described as being performed by a system of one or more computers, located in one or more locations, and programmed appropriately in accordance with this specification.

The system receives a context term and a corresponding disjunction (210). The system can receive the context term and the corresponding disjunction as part of a process of evaluating all pairs of context terms and corresponding disjunctions in an original expression, as described above with reference to step 120 of FIG. 1.

The system determines whether the context term has exactly one free variable (220). A context term effectively has exactly one free variable when evaluation of the context term results in a one-attribute relation, e.g., a one-column table. In other words, a context term has exactly one free variable when the context term does not relate multiple variables.

This is straightforwardly the case when the context term is a call having only one free variable. For example, in the following query language expression, the context term "Expr(e)" is a call having only one variable:

Expr(e) and (parent(e,f) or parent(f,e))

As another example, the following existential term has exactly one free variable "e":

exists(a,b|exprs(e,a,b))

The existential term declares two local variables a and b, but the call to "exprs" uses three variables. This results in a call to "exprs" with one free variable, e.g., the variable "e".

Evaluating this expression with bound values for a and b results in finding all matching tuples in the "exprs" relation that have matching values for a and b and returning the value of the free variable e for those tuples. Therefore, evaluating this existential term results in a one-attribute relation, and the existential term therefore effectively uses exactly one free variable.

Thus, in context terms that have some bound variables, the system can determine when the term has exactly one free variable, and regardless of how many variables the context term actually uses.

If the context term does not have exactly one free variable (220), the system does not designate the context term as a candidate for distribution (branch to 250). However, this does not mean that the context term will never become a candidate for distribution. Rather, the context term can still be designated as a candidate for distribution by other, subsequent distribution heuristics or other processes.

If the context term does have exactly one free variable (220), the system determines whether the free variable of the context term is used by every term of the corresponding disjunction (branch to 230). For example, in the following expression, the free variable e in the context term "Expr(e)" is used by every term of the corresponding disjunction:

Expr(e) and (parent(e,f) or parent(f,e))

In other words, the free variable e in the context term "Expr(e)" also occurs as a variable in every term of the corresponding disjunction.

However, in the following counter-example, the free variable e is not used by every term of the corresponding disjunction:

Expr(e) and (parent(e,f) or parent(f,e) or parent(f,g))

because the term "parent(f,g)" of the disjunction does not use the term e.

If the free variable is used by every term of the corresponding disjunction (230), the system designates the context term as a candidate for distribution into the corresponding disjunction (branch to 240). In other words, the system can designate the context term as a candidate context term. However, being a candidate context term does not necessarily mean that the context term will be distributed into the disjunction in the final query language expression because other deletion heuristics can revoke the status of the context term as a candidate for distribution.

It can be advantageous to distribute context terms having exactly one free variable because these terms never increase the size of the result. Therefore, at best, distributing the context term speeds up evaluation of the program, and at worst, the size of the result has not changed.

If the free variable is not used by every term of the corresponding disjunction (230), the system does not designate the context term as a candidate for distribution into the corresponding disjunction (branch to 250). As described above, the context term may still become a candidate for distribution into the disjunction through one or more other distribution heuristics.

Figure 3:
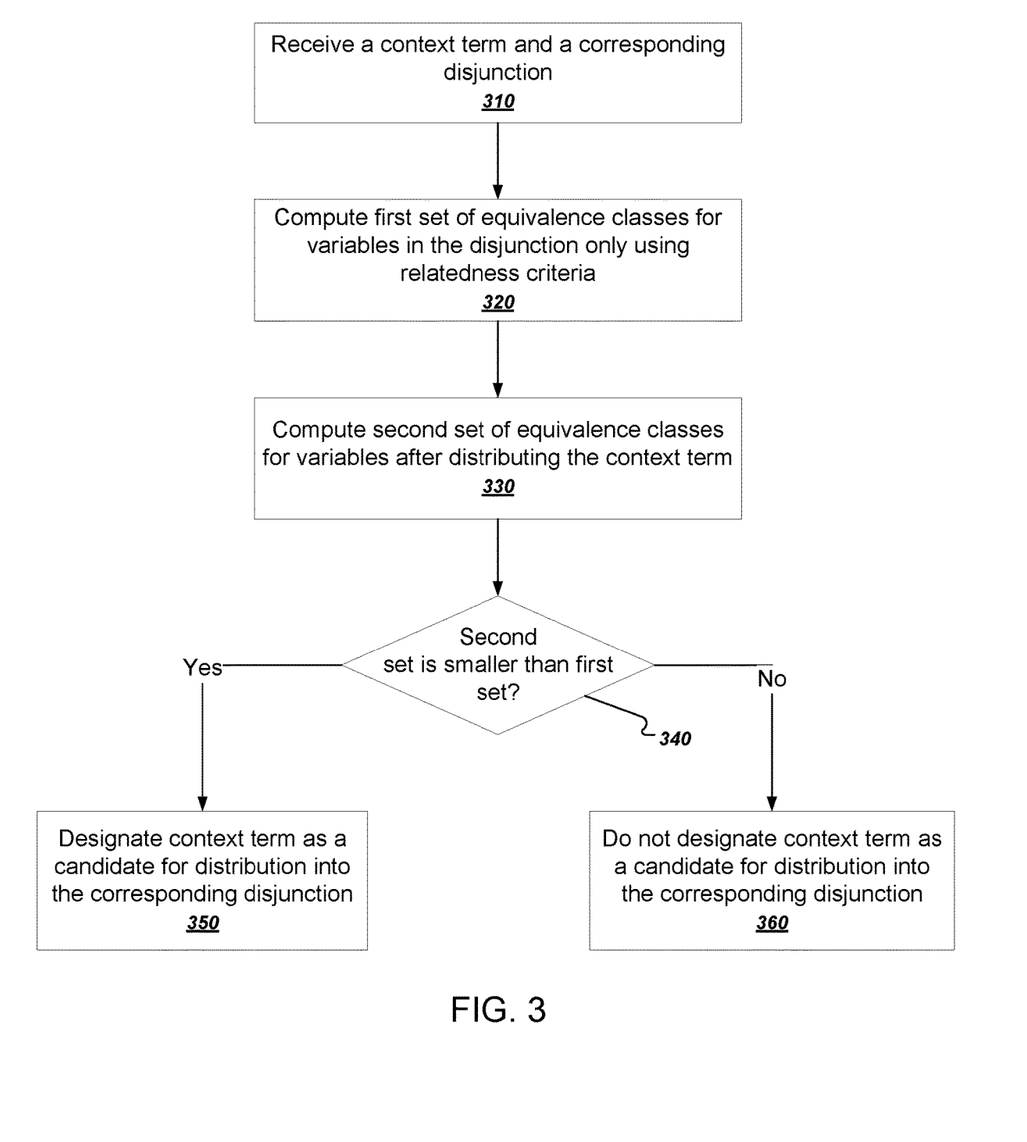
FIG. 3 is a flow chart of an example process for evaluating a context term and a corresponding disjunction according to a Cartesian product distribution heuristic.

FIG. 3 is a flow chart of an example process for evaluating a context term and a corresponding disjunction according to a Cartesian product distribution heuristic. The example process is an example of a local distribution heuristic that can be used to designate a context term as being a candidate for distribution. The example process can be performed by an evaluation engine or a query optimizer of an appropriate query language. For convenience, the process will be described as being performed by a system of one or more computers, located in one or more locations, and programmed appropriately in accordance with this specification.

The system receives an original conjunctive term having a context term and a corresponding disjunction (310). The system can receive the conjunctive term having the context term and the corresponding disjunction as part of a process of evaluating all conjunctions in an original expression, as described above with reference to step 120 of FIG. 1. The system will then determine whether or not the context term has the potential to resolve a Cartesian product or a Cartesian-product-like pattern in any of the disjunctive terms.

Computing a Cartesian product involves computing all possible combinations between the values of two different variables. For example, computing the Cartesian product between a first variable having 100 possible values and a second variable also having 100 possible values requires computing 10,000 combinations.

Computing Cartesian products is thus generally expensive and should be avoided whenever possible. In some cases, distributing a context term is beneficial because doing so can resolve a Cartesian product and obviate the need to explicitly compute and store the actual Cartesian product.

The system computes a first set of equivalence classes between variables in the disjunction only using relatedness criteria (320). An equivalence relation is a binary relation between variables that by definition implies reflexivity, symmetry, and transitivity. The system can compute an equivalence relation that represents sufficiency of relatedness of the variables. In other words, a tuple (a, b) exists in the equivalence relation if a is sufficiently related to b and b is sufficiently related to a. The reversed tuple (b, a) may or may not be represented explicitly in the equivalence relation.

The equivalence relation can be processed to generate one or more equivalence classes of variables such that variables within each class are sufficiently related to one another in a program. For example, the system can compute from an equivalence relation two equivalence classes: (1) a first equivalence class including variables x and y, and (2) a second equivalence class including just z. These equivalence classes represent that x and y are sufficiently related to each other in the program, while z is not sufficiently related to either x or y.

The sufficiency of relatedness between variables in the program can be met in a number of ways. In general, the system can traverse the structure of the program in a bottom-up fashion, inspecting the variables that occur in each term using the following relatedness criteria.

First, if the program includes a term that explicitly relates two variables, the two variables are sufficiently related. As an example, a term including "h(x,y)" can sufficiently relate the variables x and y in the program such that x and y would belong to the same equivalence class.

However, in some implementations, the system ignores negated terms for the purpose of determining sufficiency of relatedness. For example, the system can consider "NOT h(x,y)" to be insufficient to relate the variables x and y because they are only related by a negated term. The reason for this is that negated terms tend not to be very useful in resolving Cartesian-product-like terms. Consider the following conjunctive term:

f(x) AND g(y) and NOT h(x,y)

In practice, the negated term "NOT h(x,y)" constrains the order in which the conjuncts need to be evaluated. In particular, the negated term needs to be evaluated after computing "f(x) AND g(y)" because it is not possible in general to explicitly represent all tuples that do not exist in the h relation because there can be an infinite number of tuples that do not exist in h. Therefore, the Cartesian product needed to be computed first anyway, and the negated term has not saved any work.

An additional limitation exists for terms having calls deemed insufficient to guarantee the finiteness of the inputs. For example, consider a call to a predicate "plus (x, y, 1.0)" which states that the sum of x and y is 1 In this example, even though the "plus" function mentions both x and y, the "plus" function does not constrain x and y to a finite number of values, assuming that x and y are integers or floating-point numbers.

Next, if a program includes one or more conjunctions of terms, two variables are sufficiently related if the variables are related by any of the conjuncts. For example, in the following program, x is sufficiently related to y, but a is not sufficiently related to b:

f(x,y) AND g(y) AND h(a) AND i(b)

In this example, x is sufficiently related to y because x is related to y by one conjunctive term. On the other hand, a is not sufficiently related to b because a is not related to b by any of conjunctive term.

If a program includes one or more disjunctions of terms, two variables are sufficiently related if the variables are related by at least one term in every disjunct. For example, in the following program, x is sufficiently related to y, but a is not sufficiently related to b:

(f(x,y) AND g(a,b)) OR (h(x,y) AND i(y) AND NOT f(a,b))

In this example, x is sufficiently related to y because x is related to y by both disjunctive terms. On the other hand, a is not sufficiently related to b because a is related to b by only the first disjunctive term and not by all of the disjunctive terms. Although a and b occur in the term "NOT f(a,b)," negation, as described above is generally not sufficient to relate the variables a and b.

In order to implement the Cartesian product distribution heuristic, an evaluation engine for a particular query language can define relatedness criteria for all constructs in the language. Thus, an evaluation engine for a particular query language may use additional or different relatedness criteria than the ones described here. The system computes a second set of equivalence classes between variables after distributing the context term (340). In other words, for the context term under evaluation, the system can distribute the context term over the disjunction and then compute the equivalence classes using the same relatedness criteria described above.

The system determines whether the second set of equivalence classes is smaller than the first set of equivalence classes (350). If the second set of equivalence classes is smaller, the context term is likely to resolve a Cartesian product or a Cartesian-product-like term in the disjunction.

Therefore, if the second set of equivalence classes is smaller (350), the system designates the context term as a candidate for distribution into the corresponding disjunction (branch to 360). Otherwise, the system does not designate the context term as a candidate for distribution into the corresponding disjunction (branch to 370).

An example of comparing equivalence classes will now be described. Consider the following expression:

parent(e,f) AND (exp(e) AND exp(f) OR statement(e) AND statement(f))

In the context of source code analysis, this example expression can be used to determine something about source code elements represented by the variables e and f. Namely, the expression determines whether e is a parent of f in an abstract syntax tree and whether both are expressions or both are statements.

Without distributing the context term, evaluating this expression on a computer program of any size can be extremely time-consuming. This is because the inner disjunctive terms would require computing two Cartesian products: 1) a first Cartesian product that compares every expression to every other expression, and 2) a second Cartesian product that compares every statement to every other statement. After these are computed, then the context term would be considered to select only those combinations in which e is a parent of f. Thus, it is apparent intuitively that it is more sensible to distribute the term "parent(e, f)" so that only elements already known to have parent-child relationships are considered when computing the disjunctive terms.

In terms of equivalence classes, the first set of equivalence classes for the disjunction in this example expression, before distribution, would include two equivalence classes, one for e and one for f. This is because the disjunctive term by itself has no terms at all that relate e and f. In other words, the first equivalence class would be:

({e}, {f})

The proposed distribution of the context term would result in the following expression:

parent(e,f) AND exp(e) AND exp(f) OR parent(e,f) AND statement(e) AND statement(f))

The second set of equivalence classes for the disjunction in this example expression (after distribution) would include just one equivalence class, one for e and f, or:

({e, f})

This is because after distribution, each disjunctive term now includes a term that sufficiently relates e and f.

The second set of equivalence classes is smaller than the first because it contains only one class rather than two. Therefore, the system can designate the context term parent (e,f) as a candidate for distribution into the corresponding disjunction.

Figure 4:
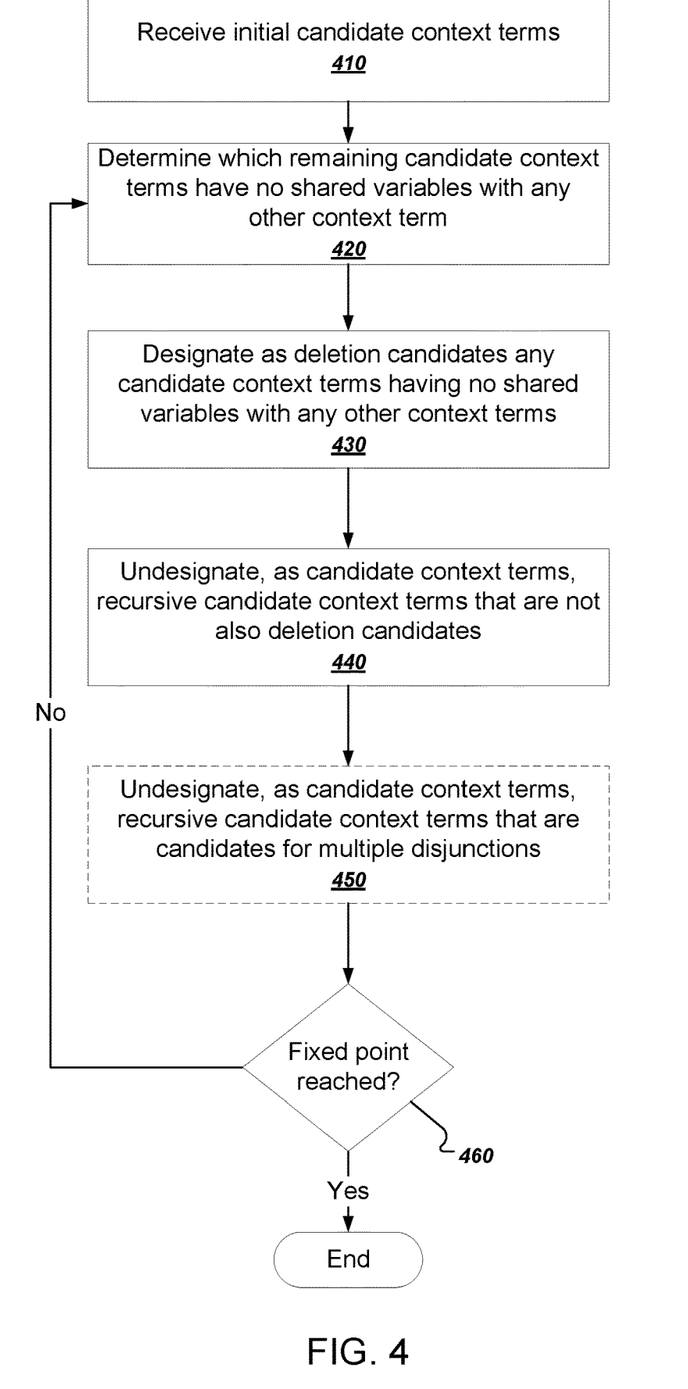
FIG. 4 is a flow chart of an example process for determining when a distributed context term can be removed from the outside of a disjunction.

FIG. 4 is a flow chart of an example process for determining when a distributed context term can be removed from the outside of a disjunction. The example process can be performed by an evaluation engine or a query optimizer of an appropriate query language. For convenience, the process will be described as being performed by a system of one or more computers, located in one or more locations, and programmed appropriately in accordance with this specification.

The system receives initial candidate context terms for an expression (410). The system can identify and designate candidate context terms for an expression using any appropriate distribution heuristics, e.g., the distribution heuristics described above with reference to FIGS. 2 and 3.

The system determines whether each candidate context term has no shared variables with any other context term (420). This test may be referred to as the shared variables deletion heuristic. The shared variables deletion heuristic can consider only context terms in the expression, e.g., without considering disjunctions paired with the context terms by the local distribution heuristics. If a candidate context term shares no variables with any other context term, it is generally safe to simply the expression by removing the candidate context term from the context of the expression without affecting the meaning of the expression.

The system designates as deletion candidates any candidate context terms having no shared variables with any other context terms (430). For example, in the following expression, the context terms "exp(a)" and "exp(b)" do not share any variables:

exp(a) and exp(b) and (c or d)

Therefore, each of these context terms can be designated as deletion candidates.

On the other hand, in the following expression the context terms "exp(a,b)" and "exp(b)" do share the variable b:

exp(a,b) and exp(b) and (c or d)

Therefore, the system does not designate either context term as a deletion candidate.

The system undesignates, as candidate context terms, recursive candidate context terms that are not also deletion candidates (440). In other words, the system can remove, from the set of candidate context terms for distribution, any recursive terms that are not also deletion candidates. This operation can affect multiple disjunctions, if multiple disjunctions were paired with the candidate context term according to the distribution heuristics.

This test may be referred to as the recursive terms heuristic. Because the recursive terms heuristic affects which context terms are candidates for distribution, the recursive terms heuristic can be considered local distribution heuristic that is evaluated only when determining which context terms can be deleted from the context.

The rationale for the recursive terms heuristic is that increasing the number of recursive terms within the same conjunction has the potential to be very expensive to compute and can actually increase the nonlinearity of the term, which is highly undesirable. For example, consider the following program having a recursive context term, "rec(a)":

rec(a) and (b or c)

Distributing the context term without also deleting the term can result in the following expression:

rec(a) and ((rec(a) and b) or (rec(a) and c)), which is effectively:

(rec(a) and rec(a) and b) or (rec(a) and rec(a) and c)

In this transformed version of the expression, the number of recursive terms has increased in each conjunction, which can potentially make the program much more expensive to compute. Thus, in some implementations, the system distributes recursive terms only if they are guaranteed to be removed by the shared variables deletion heuristic.

The system optionally undesignates, as candidate context terms, recursive candidate context terms that are candidates for multiple disjunctions (450). In other words, the system can seek to distribute a recursive context term only if the recursive context term is guaranteed to be removed (step 440) and if the recursive term will be distributed into exactly one disjunction. This test may be referred to as the modified recursive terms heuristic.

As described above, the local distribution heuristics provide the possibility of distributing a context term into only some of the corresponding disjunctions. However, distributing a recursive term into multiple corresponding disjunctions can increase the number of recursive calls in the same conjunction. Consider the following recursive context term "rec" with two corresponding disjunctions:

rec and (a or b) and (c or d)

Distributing rec into both corresponding disjunctions results in:

(rec and a or rec and b) and (rec and c or rec and d), which increases the number of recursive calls in the same conjunction. In this situation the system may be better off not distributing the recursive context term at all. Therefore, the modified recursive terms heuristic can undesignate rec as a candidate context term, even if rec was designated as a deletion candidate according to the shared variables deletion heuristic. This operation naturally affects multiple disjunctions paired with the candidate context term according to the distribution heuristics.

On the other hand, distributing rec into exactly one of the corresponding disjunctions can result in:

(rec and a or rec and b) and (c or d), which removes rec from the context and does not increase the number of recursive calls in the same conjunction. Therefore, in this example the system can keep rec as a deletion candidate, and therefore, also keep rec as a candidate context term.

The system determines whether a fixed point has been reached (460). In other words, the system determines whether the first set of pairs of candidate context terms and corresponding disjunctions and the second set of deletion candidates has not changed on the last iteration. The system computes a fixed point because the shared variables deletion heuristic and the recursive terms distribution heuristics depend on each other. In other words, modifying the first set of candidate context terms with the recursive terms distribution heuristics can affect the results of the shared variables deletion heuristic and vice versa.

Therefore, the system can continue evaluating the expression using the shared variables deletion heuristic and then one or both of the recursive terms heuristics until a fixed point has been reached.

The following examples illustrate the interplay between the local distribution heuristics and the deletion heuristics.

Consider the following expression with two context terms:

related(e, a) and Expr(e) and (parent(e,f) or parent(f,e))

The free variable distribution heuristic will designate Expr(e) as a candidate context term. But Expr(e) shares a variable with another context term, related (e, a), and therefore the shared variables deletion heuristic will not designate Expr(e) as a deletion candidate.

Therefore, the result is that Expr(e) is distributed but not deleted from the context:

related(e, a) and Expr(e) and ((Expr(e) and parent(e,f)) or (Expr(e) and parent(f,e)))

In following example, one of the context terms, "rec(e, f)," is a recursive context term:

related(e, a) and rec(e, f) and ((Expr(e) and Expr(f)) or (Stmt(e) and Stmt(f)))

The Cartesian product distribution heuristic will designate rec(e, f) as a candidate context term. The shared variables heuristic will not designate rec(e,f) as a deletion candidate because rec(e,f) shares a variable with another context term, related(e,a).

As a result, the recursive terms heuristic indicates that because rec(e, f) is a recursive candidate context term that cannot be deleted, its status as a candidate context term gets revoked entirely. Therefore, the expression remains unchanged and no context terms are distributed.

If a fixed point has not been reached, the system again evaluates the shared variables deletion heuristic by determining which remaining candidate context terms have no shared variables with any other context term (branch to 420). In other words, the system evaluates the shared variables deletion heuristic assuming that context terms that are deletion candidates have been removed from the context. This can result in even more context terms being designated as removable by the shared variables heuristic because fewer context terms are considered.

If a fixed point has been reached (460), the process ends (branch to end).

After the process has completed, the system will have a first set of pairs of candidate context terms and corresponding disjunctions as well as a second set of candidate context terms that can be safely deleted from the context after being distributed. As shown in FIG. 1, the system can then generate a transformed query language expression by distributing context terms in the first set over their corresponding disjunctions and deleting from the context any context terms in the second set. The system can then evaluate the transformed query language expression instead of the original query language expression.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a system comprising:
one or more computers and one or more storage devices storing instructions that are operable, when executed by the one or more computers, to cause the one or more computers to perform operations comprising:
receiving an original expression having a conjunction comprising a context term and a disjunction of a plurality of other terms;
evaluating the context term and the disjunction according to one or more local distribution heuristics to determine that the context term is a candidate for distribution across the disjunction of the plurality of other terms;
in response, generating a transformed expression in which the candidate context term is distributed across the disjunction of the plurality of other terms; and
evaluating the transformed expression to generate a result for the original expression.

Embodiment 2 is the system of embodiment 1, wherein generating the transformed expression comprises distributing fewer than all context terms in the original expression.

Embodiment 3 is the system of any one of embodiments 1-2, wherein the conjunction further comprises a second disjunction, and wherein the operations further comprise:
separately evaluating the context term and the second disjunction according to the one or more local distribution heuristics to determine that the context term is not a candidate for distribution across the second disjunction,
wherein generating the transformed expression comprises generating an expression in which the candidate context term is distributed across the disjunction of the plurality of other terms and is not distributed across the second disjunction.

Embodiment 4 is the system of any one of embodiments 1-3, wherein evaluating the context term according to one or more local distribution heuristics comprises determining that the context term uses exactly one free variable and determining that the free variable is used by every term of the disjunction.

Embodiment 5 is the system of embodiment 4, wherein determining that the context term uses exactly one free variable comprises determining that a result of the context term is a one-attribute relation.

Embodiment 6 is the system of any one of embodiments 1-5, wherein evaluating the context term according to one or more local distribution heuristics comprises determining that the context term resolves a Cartesian product in one or more terms of the disjunction.

Embodiment 7 is the system of any one of embodiments 1-6, wherein evaluating the context term according to one or more local distribution heuristics comprises:
computing a first set of equivalence classes for variables in the disjunction only using one or more relatedness criteria;
computing a second set of equivalence classes for variables in the disjunction after distributing the context term using the one or more relatedness criteria; and
determining that the second set of equivalence classes is smaller than the first set of equivalence classes.

Embodiment 8 is the system of embodiment 7, wherein the one or more relatedness criteria comprise:
determining whether the program includes a term that explicitly relates two variables, or
determining whether two variables are related by at least one term in every disjunctive term.

Embodiment 9 is the system of embodiment 8, wherein determining whether the program includes a term that explicitly relates two variables comprises ignoring negated terms and calls that do not bind their variables.

Embodiment 10 is the system of any one of embodiments 1-9, wherein the operations further comprise:

evaluating the context term according to a shared variables deletion heuristic to determine that the context term can be deleted from the context of the expression; and in response, deleting the context term from the context of the transformed expression.

Embodiment 11 is the system of any one of embodiments 10, wherein the operations further comprise:

determining that a second candidate context term is recursive and that the second candidate context term is not a candidate for deletion from the context; and in response, undesignating the second candidate context term as a candidate for distribution.

Embodiment 12 is the system of any one of embodiments 10, wherein the operations further comprise:

determining that a second candidate context term is recursive and that the second candidate context term is a candidate for distribution into multiple disjunctions; and in response, undesignating the second candidate context term as a candidate for distribution.

Embodiment 13 is the system of any one of embodiments 1-12, wherein the operations further comprise:

until a fixed point is reached in which a set of candidate context terms, including the context term, does not change, performing operations comprising:

evaluating one or more candidate context terms according to a shared variables deletion heuristic to designate some of the one or more candidate context terms as deletion candidates, and undesignating any recursive candidate context terms that are not deletion candidates.

Embodiment 14 is the system of embodiment 13, wherein the operations further comprise undesignating any recursive candidate context terms that are candidate context terms for multiple disjunctions.

Embodiment 15 is a method comprising the operations performed by the system of any one of embodiments 1-14.

Embodiment 16 is a computer storage medium encoded with a computer program, the program comprising instructions that are operable, when executed by data processing apparatus, to cause the data processing apparatus to perform the operations of any one of embodiments 1 to 14.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system comprising:

one or more processors and one or more storage devices storing computer-executable instructions, when executed by the one or more processors, the computer-executable instructions cause the one or more processors to perform operations comprising:

receiving an original expression for a data processing query, the original expression having a conjunction joining a plurality of terms, wherein the plurality of terms comprises a context term as one term and a disjunction of a plurality of other terms as another term;

evaluating the context term and the disjunction according to one or more local distribution heuristics to determine that the context term is a candidate for distribution across the plurality of other terms of the disjunction, the evaluating the context term and the disjunction comprising:

determining whether the context term includes a single free variable, a free variable being a variable that does not relate to other variables in the context term;

in response to a determination that the context term includes a single free variable, determining whether each of the plurality of other terms of the disjunction also includes the single free variable; and in response to a determination that each of the plurality of other terms of the disjunction also includes the single free variable, determining that the context term is a candidate for distribution across the plurality of other terms of the disjunction;

in response, generating a first transformed expression in which the candidate context term is distributed across the plurality of other terms of the disjunction;

determining, based on one or more deletion heuristics, whether the distributed candidate context term can be safely deleted from context outside of the disjunction of the first transformed expression;

in response to a determination that the distributed candidate context term can be safely deleted from context outside of the disjunction of the first transformed expression, determining that the distributed candidate context term is a deletion candidate;

generating a second transformed expression by deleting the deletion candidate from the context outside of the disjunction of the first transformed expression; and executing the second transformed expression to generate a data processing query result for the original expression, wherein the second transformed expression reduces repetition of terms that are to be evaluated individually in the original expression.

2. The system of claim 1, wherein:
the original expression comprises a plurality of context terms, each of which being a term in a conjunction along with a disjunction of a plurality of other terms, and
generating the first transformed expression comprises distributing fewer than all of the plurality of context terms in the original expression.

3. The system of claim 1, wherein the conjunction further comprises a second disjunction, and wherein the operations further comprise:
separately evaluating the context term and the second disjunction according to the one or more local distribution heuristics to determine that the context term is not a candidate for distribution across the second disjunction,
wherein generating the first transformed expression comprises generating an expression in which the candidate context term is distributed across the disjunction of the plurality of other terms and is not distributed across the second disjunction.

4. The system of claim 1, wherein evaluating the context term according to one or more local distribution heuristics comprises determining that the context term uses exactly one free variable and determining that the free variable is used by every term of the disjunction.

5. The system of claim 4, wherein determining that the context term uses exactly one free variable comprises determining that a result of the context term is a one-attribute relation.

6. The system of claim 1, wherein evaluating the context term according to one or more local distribution heuristics comprises determining that the context term resolves a Cartesian product in one or more terms of the disjunction.

7. The system of claim 1, wherein evaluating the context term according to one or more local distribution heuristics comprises:
computing a first set of equivalence classes for variables in the disjunction only using one or more relatedness criteria;
computing a second set of equivalence classes for variables in the disjunction after distributing the context term using the one or more relatedness criteria; and
determining that the second set of equivalence classes is smaller than the first set of equivalence classes.

8. The system of claim 7, wherein the one or more relatedness criteria comprise:
determining whether the original expression includes a term that explicitly relates two variables, or
determining whether two variables are related by at least one term in every disjunctive term.

9. The system of claim 8, wherein determining whether the original expression includes a term that explicitly relates two variables comprises ignoring negated terms and calls that do not bind their variables.

10. The system of claim 1, wherein the operations further comprise:
evaluating the context term according to a shared variables deletion heuristic to determine that the context term can be deleted from the context of the first transformed expression; and in response, deleting the context term from the context of the first transformed expression to generate the second transformed expression.

11. The system of claim 10, wherein the operations further comprise:
determining that a second candidate context term is recursive and that the second candidate context term is not a candidate for deletion from the context; and
in response, undesignating the second candidate context term as a candidate for distribution.

12. The system of claim 10, wherein the operations further comprise:
determining that a second candidate context term is recursive and that the second candidate context term is a candidate for distribution into multiple disjunctions; and
in response, undesignating the second candidate context term as a candidate for distribution.

13. The system of claim 1, wherein the operations further comprise:
until a fixed point is reached in which a first set of pairs of candidate context terms and corresponding disjunctions and a second set of deletion candidates do not change, performing operations comprising:
evaluating one or more candidate context terms according to a shared variables deletion heuristic to designate some of the one or more candidate context terms as deletion candidates, and
undesignating any recursive candidate context terms that are not deletion candidates.

14. The system of claim 13, wherein the operations further comprise undesignating any recursive candidate context terms that are candidate context terms for multiple disjunctions.

15. A computer-implemented method comprising:
receiving an original expression for a data processing query, the original expression having a conjunction joining a plurality of terms, wherein the plurality of terms comprises a context term as one term and a disjunction of a plurality of other terms as another term;
evaluating the context term and the disjunction according to one or more local distribution heuristics to determine that the context term is a candidate for distribution across the plurality of other terms of the disjunction, the evaluating the context term and the disjunction comprising:
determining whether the context term includes a single free variable, a free variable being a variable that does not relate to other variables in the context term;
in response to a determination that the context term includes a single free variable, determining whether each of the plurality of other terms of the disjunction also includes the single free variable; and
in response to a determination that each of the plurality of other terms of the disjunction also includes the single free variable, determining that the context term is a candidate for distribution across the plurality of other terms of the disjunction;
in response, generating a first transformed expression in which the candidate context term is distributed across the plurality of other terms of the disjunction;
determining, based on one or more deletion heuristics, whether the distributed candidate context term can be safely deleted from context outside of the disjunction of the first transformed expression;

in response to a determination that the distributed candidate context term can be safely deleted from context outside of the disjunction of the first transformed expression, determining that the distributed candidate context term is a deletion candidate;

generating a second transformed expression by deleting the deletion candidate from the context outside of the disjunction of the first transformed expression; and executing the second transformed expression to generate a data processing query result for the original expression, wherein the second transformed expression reduces repetition of terms that are to be evaluated individually in the original expression.

16. The method of claim 15, wherein:

the original expression comprises a plurality of context terms, each of which being a term in a conjunction along with a disjunction of a plurality of other terms, and generating the first transformed expression comprises distributing fewer than all of the plurality of context terms in the original expression.

17. The method of claim 15, wherein the conjunction further comprises a second disjunction, and further comprising:

separately evaluating the context term and the second disjunction according to the one or more local distribution heuristics to determine that the context term is not a candidate for distribution across the second disjunction, wherein generating the first transformed expression comprises generating an expression in which the candidate context term is distributed across the disjunction of the plurality of other terms and is not distributed across the second disjunction.

18. A computer program product comprising one or more hardware storage devices having stored thereon computer-executable instructions that are structured such that, when executed by one or more processors of a computing system cause the one or more processors to perform operations comprising:

receiving an original expression for a data processing query, the original expression having a conjunction of a plurality of terms, wherein the plurality of terms comprises a context term as one term and a disjunction of a plurality of other terms as another term;

evaluating the context term and the disjunction according to one or more local distribution heuristics to determine that the context term is a candidate for distribution across the plurality of other terms of the disjunction, the evaluating the context term and the disjunction comprising:

determining whether the context term includes a single free variable, a free variable being a variable that does not relate to other variables in the context term;

in response to a determination that the context term includes a single free variable, determining whether each of the plurality of other terms of the disjunction also includes the single free variable; and in response to a determination that each of the plurality of other terms of the disjunction also includes the single free variable, determining that the context term is a candidate for distribution across the plurality of other terms of the disjunction;

in response, generating a first transformed expression in which the candidate context term is distributed across the plurality of other terms of the disjunction;

determining, based on one or more deletion heuristics, whether the distributed candidate context term can be safely deleted from context outside of the disjunction of the first transformed expression;

in response to a determination that the distributed candidate context term can be safely deleted from context outside of the disjunction of the first transformed expression, determining that the distributed candidate context term is a deletion candidate;

generating a second transformed expression by deleting the deletion candidate from the context outside of the disjunction of the first transformed expression; and executing the second transformed expression to generate a data processing query result for the original expression, wherein the second transformed expression reduces repetition of terms that are to be evaluated individually in the original expression.

19. The computer program product of claim 18, wherein:

the original expression comprises a plurality of context terms, each of which being a term in a conjunction along with a disjunction of a plurality of other terms, generating the first transformed expression comprises distributing fewer than all of the plurality of context terms in the original expression.

20. The computer program product of claim 18, wherein the conjunction further comprises a second disjunction, and wherein the operations further comprise:

separately evaluating the context term and the second disjunction according to the one or more local distribution heuristics to determine that the context term is not a candidate for distribution across the second disjunction, wherein generating the first transformed expression comprises generating an expression in which the candidate context term is distributed across the disjunction of the plurality of other terms and is not distributed across the second disjunction.

* * * * *